(12) United States Patent
Song

(10) Patent No.: US 9,897,728 B2
(45) Date of Patent: Feb. 20, 2018

(54) METHOD FOR MANUFACTURING COLOR FILTER, COLOR FILTER, AND LIQUID CRYSTAL DISPLAY PANEL

(71) Applicant: SHENZHEN CHINA STAR OPTOELECTRONICS TECHNOLOGY CO., LTD., Shenzhen (CN)

(72) Inventor: Jiangjiang Song, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 8 days.

(21) Appl. No.: 14/416,310

(22) PCT Filed: Dec. 15, 2014

(86) PCT No.: PCT/CN2014/093884
§ 371 (c)(1),
(2) Date: May 9, 2016

(87) PCT Pub. No.: WO2016/086452
PCT Pub. Date: Jun. 9, 2016

(65) Prior Publication Data
US 2016/0349421 A1 Dec. 1, 2016

(30) Foreign Application Priority Data
Dec. 1, 2014 (CN) .......................... 2014 1 0718779

(51) Int. Cl.
G02F 1/1335 (2006.01)
G02B 5/22 (2006.01)
(Continued)

(52) U.S. Cl.
CPC ................. *G02B 5/22* (2013.01); *G02B 1/16* (2015.01); *G02B 5/20* (2013.01); *G02B 5/201* (2013.01);
(Continued)

(58) Field of Classification Search
CPC ....... G02B 5/20; G02B 5/22; G02F 1/133516; G02F 1/133514; G02F 1/133512
(Continued)

(56) References Cited

U.S. PATENT DOCUMENTS 6,054,235 A 4/2000 Bryan et al.
8,830,439 B2 * 9/2014 Asako ................... G02F 1/1334
349/110
(Continued)

FOREIGN PATENT DOCUMENTS

CN 1598623 A 3/2005
CN 101477257 A 7/2009
(Continued)

OTHER PUBLICATIONS

Office Action dated Mar. 21, 2016, by the State Intellectual Property Office of the People's Republic of China in corresponding Chinese Patent Application No. 201410718779.0. (6 pages).
(Continued)

*Primary Examiner* — Hoan C Nguyen
(74) *Attorney, Agent, or Firm* — Buchanan Ingersoll & Rooney PC

(57) ABSTRACT

A method for manufacturing a color filter, a color filter, and a liquid crystal display panel are disclosed. The method for manufacturing the color filter comprises: coating a substrate with a first light resistance material and performing corresponding treatment, so as to form a black matrix layer with a plurality of space areas; coating said black matrix layer with a light resistance material different from said first light
(Continued)

resistance material, performing treatment with a laser beam at predetermined positions, and then performing exposing, developing, and solidifying treatments, so as to form a color resistance layer in said space areas; and coating said color resistance layer with a conductive material to form a conductive film, thus obtaining said color filter.

17 Claims, 2 Drawing Sheets

(51) Int. Cl.
    *G02B 5/20*     (2006.01)
    *G02B 1/16*     (2015.01)

(52) U.S. Cl.
    CPC .. *G02F 1/133512* (2013.01); *G02F 1/133514* (2013.01); *G02F 1/133516* (2013.01)

(58) Field of Classification Search
    USPC ............................................................ 349/106
    See application file for complete search history.

(56) References Cited

U.S. PATENT DOCUMENTS

| | | | | |
|---|---|---|---|---|
| 2006/0284956 | A1* | 12/2006 | Chou | G03F 7/0007 347/107 |
| 2007/0229735 | A1* | 10/2007 | Lee | G02F 1/133512 349/106 |
| 2008/0079875 | A1* | 4/2008 | Oh | B29D 11/00634 349/108 |
| 2008/0180629 | A1* | 7/2008 | Fukai | G02F 1/133516 349/192 |
| 2012/0194933 | A1 | 8/2012 | Wu | |
| 2015/0285968 | A1 | 10/2015 | Zha et al. | |
| 2015/0299476 | A1 | 10/2015 | Liu et al. | |

FOREIGN PATENT DOCUMENTS

| | | |
|---|---|---|
| CN | 102109628 A | 6/2011 |
| CN | 102830456 A | 12/2012 |
| CN | 102830587 A | 12/2012 |
| CN | 103304811 A | 9/2013 |
| CN | 203275690 U | 11/2013 |
| CN | 103676293 A | 3/2014 |
| CN | 103992728 A | 8/2014 |
| CN | 104156131 A | 11/2014 |
| JP | H09-230124 A | 9/1997 |

OTHER PUBLICATIONS

International Search Report and Written Opinion of the International Searching Authority (Forms PCT/ISA/237, PCT/ISA/220, PCT/ISA/210) dated Sep. 11, 2015, by the State Intellectual Property Office of the People's Republic of China in corresponding International Application No. PCT/CN2014/093884. (11 pages).

* cited by examiner

METHOD FOR MANUFACTURING COLOR FILTER, COLOR FILTER, AND LIQUID CRYSTAL DISPLAY PANEL

CROSS REFERENCE TO RELATED APPLICATION

The present application claims benefit of Chinese patent application CN 201410718779.0, entitled "Method for Manufacturing Color Filter, Color Filter, and Liquid Crystal Display Panel" and filed on Dec. 1, 2014, which is incorporated herein by reference.

FIELD OF THE INVENTION

The present disclosure relates to the technical field of liquid crystal display, and particularly to a method for manufacturing a color filter, a color filter, and a liquid crystal display panel.

BACKGROUND OF THE INVENTION

During the manufacturing of liquid crystal display panel in the prior art, the color filter thereof can be manufactured through the steps of coating light resistance material, exposure, development and solidification. In the manufacturing of the color filter, several kinds of light resistance materials need to be coated on a substrate layer by layer in sequence, so as to form a color resistance layer. This process would possibly result in uneven portions at the regions where different kinds of light resistance materials overlap with each other, as the arrows shown in FIGS. 1 and 2. The uneven portions each have a shape similar to a horn, and thus can be called horn phenomenon. The aforesaid horn phenomenon would lead to that the flatness of the surface of the color resistance layer of the color filter is not desirable, which would further result in that an Indium Tin Oxide (ITO) conductive film that is formed after the color resistance layer would break up easily.

SUMMARY OF THE INVENTION

In order to solve the aforesaid technical problem, the present disclosure provides a method for manufacturing a color filter, a color filter, and a liquid crystal display panel, with which the horn phenomenon can be eliminated or eased.

According to one aspect of the present disclosure, the present disclosure provides a method for manufacturing a color filter, comprising the steps of:

coating a substrate with a first light resistance material and performing corresponding treatment, so as to form a black matrix layer with a plurality of space areas;

coating said black matrix layer with a light resistance material different from said first light resistance material, performing treatment with a laser beam at predetermined positions, and then performing exposing, developing, and solidifying treatments, so as to form a color resistance layer in said space areas; and coating said color resistance layer with a conductive material to form a conductive film, thus obtaining said color filter.

According to one embodiment of the present disclosure, said method further comprising a step of determining said predetermined positions before performing treatment with a laser beam, said step comprising:

marking on boundaries of said black matrix layer after said black matrix layer is formed, and taking these marks as benchmarks to find boundaries of all space areas for use as said predetermined positions.

According to one embodiment of the present disclosure, said predetermined positions are located at overlapped parts where black matrixes of said black matrix layer overlap said color resistance layer.

According to one embodiment of the present disclosure, the treatment with a laser beam is performed under certain preset conditions, which include a width of each laser beam and a distance between two adjacent laser beams.

According to one embodiment of the present disclosure, said width of the laser beam is equal to a width of a corresponding overlapped part.

According to one embodiment of the present disclosure, the distance between two adjacent laser beams is arranged based on a width of said space areas and a width of said black matrixes.

According to one embodiment of the present disclosure, exposure areas where the exposing and developing treatments are performed comprise said overlapped parts.

According to one embodiment of the present disclosure, said method further comprising a step of pre-baking said substrate after the treatment with a laser beam, so as to prevent an influence of a volatile solution on the development.

According to another aspect of the present disclosure, the present disclosure further provides a color filter manufactured by any one of the above methods.

According to another aspect of the present disclosure, the present disclosure further provides a liquid crystal display panel comprising the aforesaid color filter.

According to the present disclosure, the horn phenomenon on the color resistance layer of the color filter can be eliminated or eased, and thus the flatness of the surface of the color resistance layer can be improved. In this case, the situation that the ITO conductive film would break up easily on a position of the color resistance layer where the horn phenomenon occurs can be improved, and thus the performance of the color filter can be improved accordingly.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be illustrated in detail hereinafter in combination with the accompanying drawings to enable the purpose, technical solutions, and advantages of the present disclosure more clear.

Currently, the process of manufacturing a color filter mainly comprises the following steps. First, a black matrix layer is formed on a substrate. Then, color resistance materials, which belong to light resistance materials, are coated on the black matrix layer in sequence, and then exposed, developed, and solidified at respective regions, so as to form a corresponding color resistance layer. Finally, a conductive material is coated on the color resistance layer to form an ITO conductive film, and thus obtain the desired color filter. An Over Coat (OC) layer, i.e., a protection layer, which is used for protecting the color resistance layer, can also be provided between the color resistance layer and the ITO conductive film at times according to actual needs.

During the manufacturing of color filter with the above method, when the color resistance material is coated on the black matrix layer so as to form the color resistance layer, part of the color resistance layer would cover the black matrix adjacent thereto. In this case, the positions of the color resistance layer which cover the black matrix are higher than other positions of the color resistance layer, which would result in that the flatness of the surface of the color resistance layer is less satisfactory.

Figure 1:
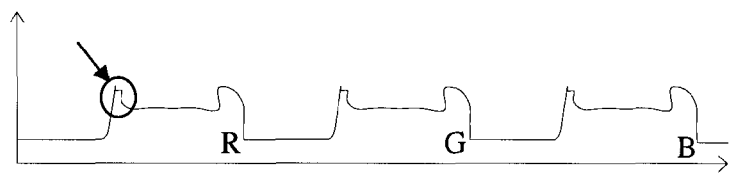
FIG. 1 schematically shows a horn phenomenon of a color filter.
Figure 2:
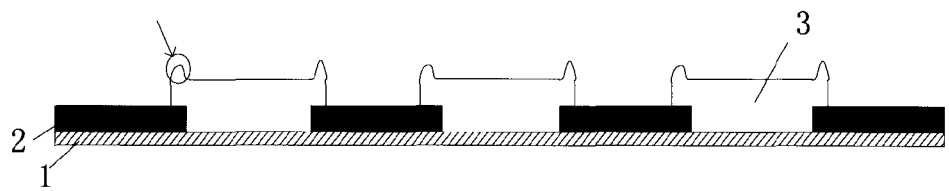
FIG. 2 is a sectional view of the horn phenomenon of the color filter.

As shown in FIG. 1, R, G, and B correspond to a red color resistance layer, a green color resistance layer, and a blue color resistance layer of the color filter respectively. There are protrusions on both sides of each of the three color resistance layers respectively, as shown by the arrow in FIG. 1. The protrusions each have a shape similar to a horn, and can be called horn phenomenon. FIG. 2 is a sectional view of a traditional color filter, wherein a substrate 1 is provided with a black matrix layer 2. The black matrix layer 2 includes a plurality of space areas, in each of which a color resistance block 3 is arranged. The position of the horn is shown by an arrow therein. When an ITO conductive film is formed on the color resistance layer where the horn phenomenon occurs, the ITO conductive film would break up easily at the horn positions, and thus the performance of the color filter would be affected.

Figure 3:
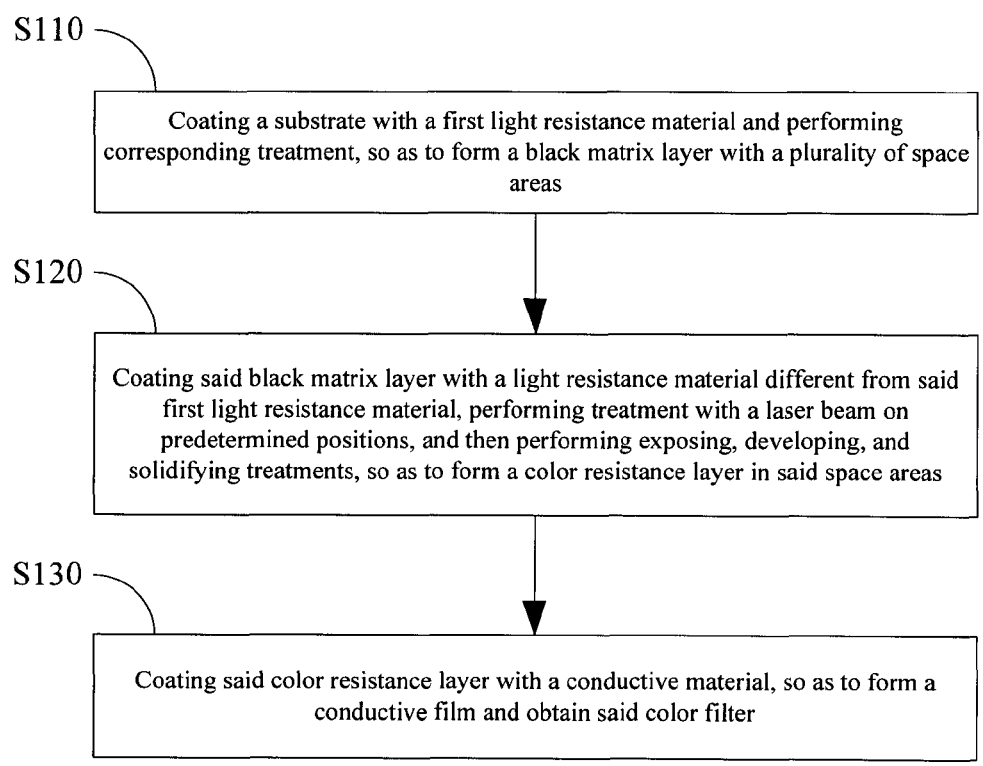
FIG. 3 is a flow chart according to one embodiment of the present disclosure.

FIG. 3 is a flow chart of manufacturing the color filter according to one embodiment of the present disclosure. The present disclosure will be illustrated in detail below with reference to FIG. 3.

In step S110, a first light resistance material is coated on a substrate and then treated, so as to form a black matrix layer with a plurality of space areas.

The basic material of the first light resistance material may be chrome, acrylic resin, or black resin, etc. The first light resistance material is used for forming the black matrix layer. In this step, first, the first light resistance material is coated on the substrate; then, a photoresist, generally a positive photoresist is coated on the first light resistance material; after that, the regions where the first light resistance material is unnecessary are exposed; and finally, the substrate is developed, and thus the desired black matrix layer can be formed. The black matrix layer is used for shading the light and increasing a color saturation of the color resistance layer, so as to improve a color contrast thereof and prevent a cross-color phenomenon. Meanwhile, a photocurrent that otherwise would be generated therein can be prevented by the black matrix layer, so that the electrodes of an array substrate can be protected.

In this step, the first light resistance material corresponding to exposure areas is removed after developing procedure. These areas are distributed in a spaced manner in the black matrix layer, so that a plurality of space areas can be formed. During practical manufacturing, these space areas can be arranged with different shapes according to actual needs.

In step S120, a light resistance material different from said first light resistance material is coated on said black matrix layer, and the layer is treated with a laser beam at predetermined positions, and then exposed, developed, and solidified, so as to form a color resistance layer in said space areas respectively. Currently, the whole color resistance layer of the color filter is formed by R color resistance layer, G color resistance layer, and B color resistance layer. However, the coating sequence of these three color resistance layers is not necessarily in the sequence of R, G, and B. Meanwhile, the light resistance material, which is used for forming the color resistance layer, is not limited by R color resistance material, G color resistance material, and B color resistance material. The light resistance material, which is used for forming the color resistance layer, should have a good heat resistance and penetrability, as well as a high color saturation. The ingredients of the color resistance layer comprise polymer, monomer, solvent, pigment, photoinitiator, and dispersant, etc, and the optical property of the color filter can be regulated through changing the pigment thereof.

This step can be further divided into the following several sub-steps, which will be illustrated below taking coating R color resistance layer as an example. The color resistance layer formed therein is not necessarily R color resistance layer, while G color resistance layer, B color resistance layer, or other color resistance layers are all applicable.

Figure 4A:
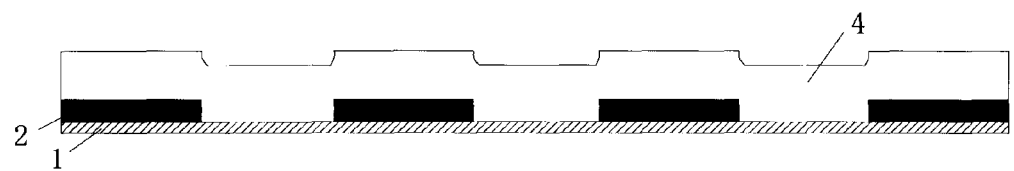
FIG. 4a schematically shows a substrate coated with R color resistance material according to one embodiment of the present disclosure.

First, R color resistance material is coated on the black matrix layer formed therein. The substrate coated with R color resistance material is shown in FIG. 4a, wherein a substrate is indicated with reference number 1, a black matrix is indicated with reference number 2, and an R color resistance material layer is indicated with reference number 4.

Figure 4B:
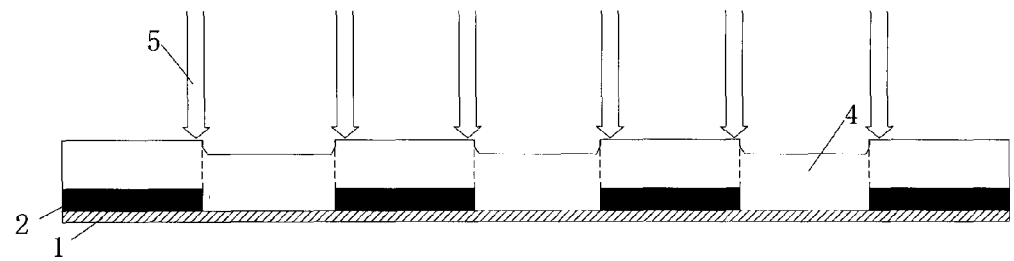
FIG. 4b schematically shows the substrate as shown in FIG. 4a when a laser beam is applied.

Then, the substrate, which is coated with R color resistance material, is treated with a laser beam at predetermined positions. Before performing treatment with a laser beam, the irradiation positions, i.e., the aforesaid predetermined positions of the laser beam should be determined. According to one embodiment of the present disclosure, the boundaries of the black matrix layer are marked, and these marks are taken as benchmarks to find boundaries of all space areas, which serve as the predetermined positions. The size of the color filter and its position on the substrate can be determined by the boundaries of the black matrix layer, and the irradiation positions of the laser beam can be determined by the boundaries of the space areas. FIG. 4b schematically shows a substrate coated with R color resistance material when a laser beam is applied, wherein the laser beam is indicated with reference number 5, and the dotted lines correspond to the boundaries of the space areas, i.e., the irradiation positions of the laser beam. The irradiation positions of the laser beam correspond to the overlapped parts where the black matrixes of the black matrix layer overlap the color resistance layer to be formed therein.

When the R color resistance material layer is treated with a laser beam, the treatment should be performed under certain preset conditions, which include a width of each laser beam and a distance between the laser beams.

The width of the laser beam is arranged to be equal to a width of a corresponding overlapped part where the black matrix overlap the adjacent R color resistance layer to be formed therein. The width of the laser beam is determined by the sizes of the black matrix and the R color resistance block, and can be determined during an initial period when the color filter is designed. Grooves are formed on the R color resistance material layer on positions corresponding to the irradiation positions of the laser beam, as shown by an arrow in FIG. 4c.

The color resistance material on the overlapped parts where the black matrixes overlap the adjacent R color resistance layer to be formed therein can be melted by a high temperature generated when a laser beam is applied, so that the height of the color resistance material layer on this part can be reduced. Since the width of the laser beam is arranged to be equal to the width of the corresponding overlapped part where the black matrix overlaps the adjacent R color resistance layer to be formed therein, the height of other parts of the color resistance layer apart from said overlapped part would not be reduced. In this case, the horn phenomenon generated on the overlapped parts where the black matrixes overlap the adjacent R color resistance layer can be eliminated or eased, and thus the flatness of the surface of the color resistance layer can be improved. During practical manufacturing of color filter, an intensity of the laser beam should not be too high and an irradiation time thereof should not be over long. In this manner, it can be avoided that the color resistance material of the color resistance layer on a position where otherwise a horn phenomenon would occur is over-melted, and thus the height of the color resistance layer at this position is lower than the height of the color resistance layer at other positions. The intensity and irradiation time of the laser beam can be selected according to different color resistance materials.

Figure 4C:
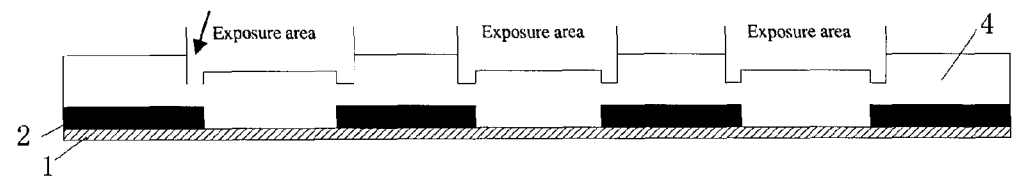
FIG. 4c schematically shows the substrate as shown in FIG. 4b when an exposing treatment is performed.

The spaces among the laser beams are associated with the width of the space area and the width of the black matrix. The space between two laser beams which irradiate the same black matrix and the space between two laser beams which irradiate the same space area can be arranged to be equal or unequal to each other. The spaces among the laser beams are determined when the black matrix layer is formed. According to one embodiment of the present disclosure, the space between two laser beams which irradiate the same black matrix and the space between two laser beams which irradiate the same space area are equal to each other, as shown in FIG. 4c.

After that, the substrate, after being treated by the laser beam, is exposed. The substrate should be coated with a negative photoresist before exposure. The exposure areas where the exposing treatment is performed correspond to the R color resistance material layer between the black matrixes. In addition, the exposure areas further comprise the overlapped parts where the R color resistance layer to be finally formed therein overlaps the adjacent black matrix. The edges of the exposure areas correspond to the edges of two grooves formed between two adjacent black matrixes by means of the laser beam, as shown in FIG. 4c.

Figure 4D:
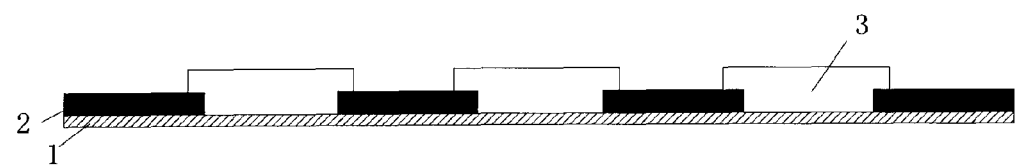
FIG. 4d schematically shows the substrate as shown in FIG. 4c after a developing treatment is performed.

Next, the substrate, after being exposed, is developed, so as to obtain the desired R color resistance layer. As shown in FIG. 4d, the substrate is indicated with reference number 1, the black matrix is indicated with reference number 2, and a developed R color resistance block is indicated with reference number 3. After the developing treatment, the R color resistance material in the non-exposure areas is removed, while the R color resistance material in the exposure areas is reserved, so as to form the R color resistance layer. The protrusion parts in the middle of the exposure areas as shown in FIG. 4c can finally form the structures as shown in FIG. 4d under the influence of a developer.

Finally, the R color resistance layer formed therein is solidified. In this step, the R color resistance layer is solidified through baking. The purpose of the solidifying treatment is to remove the residual water and developer during developing procedure and increase an adhesion and flatness of the color resistance layer. A baking temperature can be set to be 200° C. to 250° C. In one preferred embodiment of the present disclosure, the temperature thereof is set to be 230° C. A baking time can be set to be 20 minutes to 30 minutes according to different kinds of color resistance layer.

During practical manufacturing procedure, the arrangement of R color resistance layer, G color resistance layer, and B color resistance layer is not limited by the structure as shown in FIGS. 4a to 4d, and the R, G, and B color resistance layers can be arranged in different manners according to actual needs. In addition, during manufacturing of each color resistance layer in sequence, the substrate can be treated with a laser beam after the color resistance layer of the previous procedure is formed but before another color resistance layer is coated, whereby the color resistance layer formed in the previous procedure can be protected.

In step S130, a conductive material is coated on the R color resistance layer, so as to form a conductive film (which is an ITO conductive film in general) and obtain said color filter.

According to actual needs, the substrate, after the plurality of color resistance layers are formed therein, can be coated with a resin material to form an OC layer so as to protect the color resistance layers. Then, the OC layer is coated with the conductive material to form the conductive film.

According to one embodiment of the present disclosure, the color resistance layers, after being treated with a laser beam and before being exposed and developed, is pre-baked, so as to prevent an influence of a volatile solution on the development thereof. A pre-bake temperature can be set to be 70° C. to 100° C., and a pre-bake time can be set to be 70 seconds to 120 seconds. The pre-bake temperature range and pre-bake time are dependent on to the color resistance material coated therein.

According to one embodiment of the present disclosure, the present disclosure further provides a color filter manufactured by the above method, which comprises a black matrix layer with a plurality of space areas formed on the substrate. The space areas are provided with a color resistance layer, which is formed after being treated with a laser beam, and then exposed, developed, and solidified. The color filter further comprises an ITO conductive film coated on the color resistance layer. Since the step of treatment with laser beam is added into the manufacturing procedure of the color filter, the horn phenomenon which otherwise would be generated on the color resistance layer can be eased or eliminated. In this case, the ITO conductive film formed on the color resistance layer would not break up easily, and thus the performance of the color filter can be improved accordingly.

According to one embodiment of the present disclosure, the present disclosure further provides a liquid crystal display panel comprising the color filter manufactured by the above method. The liquid crystal display panel comprises a color filter and an array substrate. The color filter comprises a black matrix layer with a plurality of space areas formed on the substrate. The space areas are provided with a color resistance layer, which is formed after being processed with a laser beam, and then exposed, developed, and solidified. The color filter further comprises an ITO conductive film coated on the color resistance layer. Since in the color filter used in the liquid crystal display panel, the horn phenomenon is eased or eliminated, the ITO conductive film formed on the color resistance layer would not break up easily. In this case, the uniformity and continuity of coating the ITO conductive film can be improved, which would facilitate the control of the liquid crystal molecules, and thus the light penetrability of the liquid crystal display panel can be improved.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

LIST OF REFERENCE SIGNS 1 substrate
2 black matrix
3 color resistance block
4 R color resistance material layer
5 laser beam

The invention claimed is:

1. A method for manufacturing a color filter, comprising the steps of:
   coating a substrate with a first light resistance material and performing corresponding treatment, so as to form a black matrix layer with a plurality of space areas;
   coating said black matrix layer with a light resistance material different from said first light resistance material, performing treatment with a laser beam at predetermined positions, and then performing exposing, developing, and solidifying treatments, so as to form a color resistance layer in said space areas; and
   coating said color resistance layer with a conductive material to form a conductive film,
   wherein the treatment with a laser beam is performed under preset conditions which include a width of each laser beam, and wherein said width of the laser beam is equal to a width of an overlapped part where a black matrix of said black matrix layer overlaps said color resistance layer.

2. The method according to claim 1, further comprising a step of determining said predetermined positions before performing treatment with a laser beam, said step comprising:
   marking on boundaries of said black matrix layer after said black matrix layer is formed, and taking these marks as benchmarks to find boundaries of all space areas for use as said predetermined positions.

3. The method according to claim 2, wherein said predetermined positions are located at the overlapped parts where the black matrixes of said black matrix layer overlap said color resistance layer.

4. The method according to claim 3, said preset conditions further include a distance between two adjacent laser beams.

5. The method according to claim 4, wherein the distance between two adjacent laser beams is arranged based on a width of said space areas and a width of said black matrixes.

6. The method according to claim 5, wherein exposure areas where the exposing and developing treatments are performed comprise said overlapped parts.

7. The method according to claim 1, further comprising a step of pre-baking said substrate after the treatment with a laser beam, so as to prevent an influence of a volatile solution on the development.

8. A color filter, comprising:
   a black matrix layer with a plurality of space areas formed through coating a substrate with a first light resistance material and performing corresponding, treatment;
   a color resistance layer formed in said space areas through coating said black matrix layer with a light resistance material different from said first light resistance material, performing treatment with a laser beam at predetermined positions, and then performing exposing, developing, and solidifying treatments, wherein the treatment with a laser beam is performed under preset conditions which include a width of each laser beam, and wherein said width of the laser beam is equal to a width of an overlapped part where a black matrix of said black matrix layer overlaps said color resistance layer; and
   a conductive film formed through coating said color resistance layer with a conductive material.

9. The color filter according to claim 8, wherein said predetermined positions are located at the overlapped parts where the black matrixes of said black matrix layer overlap said color resistance layer.

10. The color filter according to claim 9, wherein the distance between two adjacent laser beams is arranged based on a width of said space areas and a width of said black matrixes.

11. The color filter according to claim 10, wherein exposure areas where the exposing and developing treatments are performed comprise said overlapped parts.

12. The color filter according to claim 11, wherein said substrate is pre-baked after the treatment with a laser beam, so as to prevent an influence of a volatile solution on the development.

13. A liquid crystal display panel, comprising a color filter and an array substrate, said color filter comprising:
   a black matrix layer with a plurality of space areas formed through coating a substrate with a first light resistance material and performing corresponding treatment;
   a color resistance layer formed in said space areas through coating said black matrix layer with a light resistance material different from said first light resistance material, performing treatment with a laser beam at predetermined positions, and then performing exposing, developing, and solidifying treatments, wherein the treatment with a laser beam is performed under preset conditions which include a width of each laser beam, and wherein said width of the laser beam is equal to a width of an overlapped part where a black matrix of said black matrix layer overlaps said color resistance layer; and
   a conductive film formed through coating said color resistance layer with a conductive material.

14. The liquid crystal display panel according to claim 13, wherein said predetermined positions are located at the overlapped parts where the black matrixes of said black matrix layer overlap said color resistance layer.

15. The liquid crystal display panel according to claim 14, wherein a distance between two adjacent laser beams is arranged based on a width of said space areas and a width of said black matrixes.

16. The liquid crystal display panel according to claim 15, wherein exposure areas where the exposing and developing treatments are performed comprise said overlapped parts.

17. The liquid crystal display panel according to claim 16, wherein said substrate is pre-baked after the treatment with a laser beam, so as to prevent an influence of a volatile solution on the development.

* * * * *